United States Patent [19]

Weiss et al.

[11] Patent Number: 5,496,789
[45] Date of Patent: Mar. 5, 1996

[54] HYDROGENATION CATALYST BASED ON A PLATINUM METAL PARTIALLY POISONED WITH FINELY DIVIDED SULFUR

[75] Inventors: Franz-Josef Weiss, Neuhofen; Hugo Fuchs, Ludwigsafen; Gerald Neubauer, Weinheim; Heinz-Walter Schneider, Ludwigshafen, all of Germany

[73] Assignee: BASF Aktiengesellschaft, Ludwigshafen, Germany

[21] Appl. No.: 224,677

[22] Filed: Apr. 7, 1994

[30] Foreign Application Priority Data

Apr. 7, 1993 [DE] Germany .................. 43 11 420.2

[51] Int. Cl.⁶ .................................... B01J 23/42
[52] U.S. Cl. .................. 502/339; 502/216; 502/334
[58] Field of Search ................... 502/334, 339, 502/216

[56] References Cited

U.S. PATENT DOCUMENTS 2,823,101  2/1958  Jockers et al. .
3,872,028  3/1975  Rijnten et al. ............... 252/439
4,895,711  1/1990  Biffar et al. ................. 423/387
4,956,331  9/1990  Tsurumi et al. .............. 502/339
5,106,800  4/1992  Moser et al. ................. 502/334
5,155,081  10/1992  Steigleiter et al. .
5,358,920  10/1994  Ma et al. ..................... 502/330

FOREIGN PATENT DOCUMENTS 1550453  12/1968  France .

Primary Examiner—Anthony McFarlane
Attorney, Agent, or Firm—Keil & Weinkauf

[57] ABSTRACT

A hydrogenation catalyst, obtainable by carrying out essentially the following steps:

(a) treatment of a platinum metal salt with finely divided sulfur followed by (b) reduction of the platinum metal salt to metallic platinum metal.

6 Claims, No Drawings

HYDROGENATION CATALYST BASED ON A PLATINUM METAL PARTIALLY POISONED WITH FINELY DIVIDED SULFUR

The present invention relates to a hydrogenation catalyst which can be obtained by carrying out essentially the following steps:

(a) treatment of a platinum metal salt with finely divided sulfur, followed by (b) reduction of the platinum metal salt to metallic platinum metal.

The invention also relates to a process for the preparation of the hydrogenation catalyst of the invention, to its use as hydrogenation catalyst particularly for the manufacture of hydroxylammonium salts, and to a process for the regeneration of hydrogenation catalysts.

The expense incurred in the preparation and regeneration of a catalyst and the activity, selectivity, and useful life of the catalyst used constitute a decisive factor in determining whether a catalyzed reaction is feasible for industrial use or not. This is the case, for example, when effecting catalytic reduction of nitrogen monoxide with hydrogen to form hydroxylammonium salts. Hydrogenation catalysts containing platinum metal are normally used in this process.

Processes for the preparation of hydroxylammonium salts are known, for example, from DE-PS 956,038 and DE-A 4,022,851. The catalysts used in said references are obtained by precipitation of platinum on to suspended graphite supports if desired with the addition of poisoning means such as compounds of sulfur, selenium, arsenic, or tellurium. The drawbacks of these processes are, on the one hand, the unduly rapid loss of activity and selectivity, and on the other hand, the use of an expensive manufacturing process having a deleterious effect on the environment.

Thus it has hitherto been usual to buffer the reaction mixture containing a platinum metal salt with, say, sodium acetate prior to the addition of the catalyst poison. The buffer is contaminated with organic substances after the reaction has taken place and this must be removed from the waste water, which incurs high disposal costs. Furthermore, buffering is expensive, particularly when use is made of sodium thionite as donor for the sulfur acting as catalyst poison, due to the fact that it is necessary to set up a redox potential.

The sodium thionite mentioned in DE-PS 956,038 is also unstable in atmospheric oxygen, and it must be handled in compliance with certain safety precautions (avoidance of heating above 50° C. and the occurrence of flying sparks, storage in a cool and dry atmosphere).

Other sulfur donors as yet proposed for partial poisoning of the catalyst have equally decisive drawbacks: thiourea is considered to be carcinogenic, sodium thiosulfate and sodium sulfite are decomposable, sodium sulfide is considered to be toxic and moreover, these poisoning agents are not conducive to satisfactory catalyst properties.

It is thus an object of the present invention to provide hydrogenation catalysts which do not exhibit the aforementioned drawbacks. In particular, it is desirable to simplify the preparation of hydrogenation catalysts, to reduce the amounts of waste produced, and to avoid the use of readily decomposable and toxic substances for partial poisoning.

Accordingly, we have found the hydrogenation catalysts defined above.

We have also found a process for the preparation and regeneration of the hydrogenation catalysts of the invention as well as a method of using them for the preparation of hydroxylammonium salts.

The hydrogenation catalysts of the invention are obtained by the treatment of a platinum metal salt with finely divided sulfur and subsequent reduction of the platinum metal salt thus treated to metallic platinum metal.

Theoretically, all platinum metal salts which are suitable for hydrogenation can be used as platinum metal salts, eg, salts of nickel, palladium, platinum, cobalt, rhodium, iridium, and ruthenium and preferably palladium and platinum and more preferably platinum. The water-soluble salts of these metals are especially suitable, such as, in particular, the halides, nitrates and sulfates. The following are examples thereof:

platinum(IV) compounds such as hexachloroplatinic acid and alkali metal and ammonium salts thereof, tetrachloroplatinate or tetrachlorodihydroxyplatinic acid;

platinum(II) compounds such as tetrachloroplatinic acid and alkali metal salts thereof or platinum(II) chloride;

palladium(II) compounds such as hexachloropalladous acid and salts thereof or palladium(II) chloride.

Theoretically, mixtures of substantially platinum metal or platinum metal salts with other metal salts, for example salts of arsenic, antimony, selenium or tellurium can be used.

In accordance with the present invention finely divided sulfur is used as sulfur serving to effect partial poisoning, for example commercial "flowers of sulfur". Sulfur having a particle size smaller than 500 μm and preferably smaller than 50 μm is preferably used, and more preferably use is made of a sulfur having a particle size distribution in which 20% of the particles are smaller than 1 μm, 50% of the particles are smaller than 5 μm and 90% of the particles are smaller than 10 μm. Suitable sulfur is commercially available, for example as wettable sulfur "Humulus WG" (BASF) or can be obtained from, for example, flowers of sulfur or finely ground sulfur by conventional methods, in particular by sifting.

The platinum metal salt is usually treated with the finely divided sulfur in aqueous solution by contacting the aqueous platinum metal salt solution with the finely divided sulfur. The sulfur can also be used as colloidal sulfur solution (cf Jander-Blasius, Einfuehrung in das anorganisch-chemische Praktikum, 5th Edition, 1964, pp. 415). It is preferred to add the sulfur in the form of an aqueous suspension.

Theoretically, it is possible to use other solvents instead of, or in addition to, the preferred solvent water.

Substances which improve the solubility or dispersibility of the starting compounds can be added to the reaction mixture. In particular, as far as has been observed, all commonly used surfactants are suitable for this purpose, in order to improve the solubility and wettability of the sulfur.

Suitable surfactants, which are also called dispersing agents, are described, for example, in Ullmanns Encyklopaedie der technischen Chemie, 4th Edition, Vol. 23, Verlag Chemie, Weinheim, 1983, pp. 31–39. The following are examples thereof:

Polyacrylates, poly(vinyl sulfonate)s, polyvinylpyrrolidone, TAMOL® (BASF), Schaeffer's salt as well as lignin sulfonates.

In a particularly preferred embodiment, lignin sulfonates are used as surfactant (known per se, eg, from Ullmann, Encyclopaedie der techn. Chemie, 4th Edition, Vol. 16, pp. 253 et seq, Verlag Chemie, 1978) and preferably alkali metal lignin sulfonates such as sodium and potassium lignin sulfonates, since they can be readily removed with the washing water when the finished catalyst is washed, and they have no adverse effect on the environment on account of their good degradability properties.

The surfactants are generally added to the reaction mixture prior to the addition of the sulfur to the platinum metal salt or they are advantageously added to the aqueous sulfur suspension.

The ratio, by weight, of surfactant to sulfur is usually adjusted so as to be in the range of from 0.1 to 50 and preferably from 1 to 15 wt %. As far as we have observed, more than 50 wt % of surfactant provides no significant improvement in the solubility of the sulfur, and, generally, no detectable improvement is achieved when use is made of amounts below 0.1 wt %.

The temperature during the treatment of the platinum metal salt with the finely divided sulfur is normally adjusted so as to be in the range of from 20° to 95° C. and preferably from 40° to 95° C. and more preferably from 50° to 85° C.

The pH during the treatment of the platinum metal salt with the finely divided sulfur is usually adjusted so as to be in the range of from 1.5 to 11.5 and preferably from 2.5 to 8.5, more preferably from 4.5 to 8.5 and most preferably from 7.0 to 7.5.

The duration of the treatment of the platinum metal salt with the finely divided sulfur, ie the time extending from the addition of the finely divided sulfur to the addition of the reducing agent, is usually adjusted so as to be in the range of from 0.5 to 60 min and preferably from 2 to 15 min. Treatment for less than 0.5 min generally provides inadequate poisoning of the catalyst, treatment for more than 60 min has, as far as has been observed, no further advantage.

The molar ratio of platinum metal to sulfur is usually adjusted so as to be in the range of from 90 to 10 and preferably of 75 to 35%.

Following partial poisoning with sulfur, the platinum metal salt is reduced to metallic platinum metal by adding, advantageously, a reducing agent to the reaction mixture obtained following the treatment of the platinum metal salt with finely divided sulfur.

Normally all prior reducing agents capable of reducing platinum metal salts to platinum metal are suitable, eg, hydrazine, formaldehyde, formic acid, or an alkali metal or alkaline-earth metal formate such as sodium, potassium, and calcium formates and more preferably formic acid.

The molar ratio of platinum metal to reducing agent is usually adjusted so as to be in the range of from 0.5 to 100 mol % and preferably from 5 to 85 mol %.

The temperature during the reduction is normally adjusted so as to be in the range of from 20° to 95° C. and preferably from 40° to 95° C. and more preferably from 50° to 85° C.

The pH used for the reduction substantially depends on the amount of reducing agent used and the nature thereof. For example, when formic acid is used, the pH is usually adjusted to a value between 0.5 and 3.5 and preferably between 1.0 and 2.5.

On completion of the reduction, the catalyst is usually worked up in conventional manner, for example by removing it from the reaction mixture by filtration, and washing it, advantageously with water.

In a preferred embodiment, the reduction and, if desired, the treatment with finely divided sulfur is carried out in the presence of a catalyst support such as graphite or activated charcoal, preferably graphite. It is especially preferred to admix the platinum metal salt with finely divided graphite prior to the treatment with finely divided sulfur, the graphite usually having a particle size ranging from 0.1 to 1000 μm and preferably of from 0.1 to 300 μm and more preferably from 5 to 100 μm. The molar ratio of carbon (ie graphite or activated charcoal) to platinum metal is generally adjusted so as to be in the range of from 99.99 to 10 mol % and is preferably from 99.99 to 30 mol %. In particular, when platinum is the metal concerned, the said molar ratio is preferably from 99.99 to 90 mol % and more preferably from 99.98 to 95.0 mol %.

The catalysts obtained using the process of the invention are suitable for the hydrogenation of both organic and inorganic compounds, as far as hitherto discerned.

It is preferred to use the catalysts of the invention for the hydrogenation of olefinically or acetylenically unsaturated compounds, and also for the hydrogenation of carboxylic acids, aldehydes, or ketones to the corresponding alcohols or of nitriles to the corresponding amines. The catalysts of the invention are also suitable for the hydrogenation of inorganic substances such as oxygen, but are particularly useful for the preparation of hydroxylammonium salts by the hydrogenation of nitrogen monoxide in aqueous mineral acids.

In the manufacture of hydroxylammonium salts, a molar ratio of hydrogen to nitrogen monoxide of from 1.5.:1 to 6:1 and preferably from 3:1 to 5:1 is usually mantained. Particularly good results have been found to be obtained when care is taken to ensure that a molar ratio of hydrogen to nitrogen monoxide of from 3.5:1 to 5:1 is maintained in the reaction zone.

The acid used is advantageously a strong mineral acid such as nitric acid, sulfuric acid, or phosphoric acid. Acid salts such as ammonium bisulfate are generally also suitable. It is usual to use from 4N to 6N aqueous acids, and the acid concentration is not usually allowed to fall below 0.2N during the course of the reaction.

The hydrogenation of nitrogen monoxide is generally carried out at a temperature in the range of from 30° to 80° C. and preferably from 35° to 60° C. Also, the pressure during the hydrogenation is generally adjusted so as to be in the range of from 1 to 30 and preferably from 1.5 to 20 bar (absolute).

The ratio of mineral acid to catalyst depends on the platinum metal used, and is, in the case of platinum/graphite catalysts, generally in the range of from 10 to 100 g and preferably from 30 to 80 g of platinum per liter of mineral acid.

In a further preferred embodiment, in particular in the manufacture of hydroxylammonium salts, the catalyst is treated ("activated"), prior to the actual hydrogenation, with hydrogen in acid solution, advantageously in the mineral acid in which the hydrogenation is to be carried out.

Spent platinum metal catalysts can be regenerated with the aid of the process of the invention by dissolving the platinum metal of the catalyst normally by means of an acid or an acid mixture, and separating any insoluble constituents. The platinum metal salt solution obtained is then neutralized, and the platinum metal salt is then treated according to the process of the invention described above by mixing it with finely divided sulfur and then reducing the platinum metal salt thus treated with a reducing agent, whilst a support material can be added prior to, during, or subsequently to the treatment with finely divided sulfur if desired.

As far as we have observed, the catalysts of the invention are superior to prior art catalysts used for the the same purpose as regards activity, selectivity and maximum on-stream time. The process of the invention for the preparation of and regeneration of hydrogenation catalysts has the advantage over prior processes in that it is simpler to carry out and at the same time reduces the amount of waste products produced and avoids the use of readily decomposable and toxic substances for partial poisoning.

EXAMPLES

Hydrogenation Catalyst Based on a Platinum Metal Partially Poisoned with Finely Divided Sulfur The particle size was determined using a Malvern Mastersizer (cf Verfahrenstechnik 24 (1990) pp. 36 et seq) by measuring the Fraunhofer diffraction at a wavelength of 633 nm. The use of a supplementary lens having a focal length of 300 mm made it possible to determine the particle size distribution over a range of from 1 to 600 μm.

Measurement was effected by adding a spatula-tipful of the test powder to one liter of a 0.1 wt % strength aqueous solution of Nekanil® 910 (BASF AG, Nekanil® 910 is a nonyl phenol which has been caused to react with from 9 to 10 mol of ethylene oxide; properties: water-white, viscous liquid; non-ionic; density at 20° C. 1.04 g/cm$^3$; pour-point: below −10° C.; pH of a 1 wt % strength solution: 6.5 to 8.5). The resulting test mixture was subjected to ultrasonic treatment for one minute before readings were taken.

EXAMPLE 1

640 g (calculated as dry substance) of a finely divided graphite support (particle size in the range of from 0.1 to 300 μm) were suspended in 500 mL of water and 100 mL of aqua regia, 0.5 wt % of platinum was added as hexachloroplatinic acid hexahydrate, and the mixture was stirred overnight at a temperature of 80° C. The next day the suspension was diluted with 400 mL of water, cooled to 30° C., and adjusted to pH 7.5 with soda. 150 mg of finely divided elementary sulfur suspended in 50 mL of water (distribution of particle sizes: 20%<1 μm; 50%<5μm; 10%<10 μm) were added to the reaction mixture. Following a period of 10 min, 100 mL of 99 wt % strength formic acid were then added to the reaction mixture.

50 g of the catalyst thus treated were suspended in 1250 mL of 20 wt % strength $H_2SO_4$, and treated with $H_2$ at a temperature of 40° C.

121L/h of a mixture of 67.7 vol % of $H_2$ (99.95%strength) and 32.3 vol % of NO (99.6% strength) were then fed to the suspension.

Following the introduction of a total of 423 L of the above gas mixture there were obtained 1342 mL of a solution having the following composition:

18.5 g/L $H_2SO_4$ 108.1 g/L $NH_2OH$ (as $(NH_3OH)_2SO_4$)

7.3 g/L $NH_3$ (as $(NH_4)_2SO_4$)

The total amount of off-gas was 91.6 L of the following composition:

76.7 vol % of $H_2$ 19.5 vol % of NO 2.8 vol % of $N_2O$

The following values for selectivity and space-time yield can be calculated from these results:
Selectivity:

85.2% toward $NH_2OH$ 10.1% toward $NH_3$ 4.7% toward $N_2O$

Space-time yield:

1.12 mol/$L_{RR}$fl.·h, based on NO conversion (consumption)

0.96 mol/$L_{RR}$fl.·h, based on $NH_2OH$, formed where mol/$L_{RR}$fl..h denotes moles per liter of fluid reaction space per hour.

EXAMPLE 2

A suspension of 640 g (calculated as dry substance) of a finely divided graphite support (particle size in the range of 0.1 to 300 μm), 500 mL of water, 100 mL of aqua regia, and 0.5wt % of platinum in the form of hexachloroplatinic acid hexahydrate was stirred overnight at a temperature of 80° C. The next day, the suspension was diluted with 400 mL of water, cooled to 30° C., and adjusted to pH 7.5 using soda. A suspension of 150 mg of finely divided elementary sulfur ( distribution of particle sizes: 20%<1 μm; 50%<5 μm; 90%<10 μm), 20 mg of sodium lignin sulfonate, and 50 mL of water was then added. Following a period of 10 min, 100 mL of 99 wt % strength formic acid were added to the reaction mixture.

50g of the catalyst thus treated were suspended in 1250mL of 20 wt % strength $H_2SO_4$ and treated with $H_2$ at a temperature of 40° C.

121 L/h of a mixture of 68.0vol % of $H_2$ (99,95% strength) and 32.0 vol % of NO (99.6% strength) were then fed to the suspension.

Following the introduction of a total of 406 L of the above gas mixture there were obtained 1340 mL of a solution having the following composition:

17.2 g/L $H_2SO_4$ 193.5 g/L $NH_2OH$ (as $(NH_3OH)_2SO_4$)

13.3 g/L $NH_3$ (as $(NH_4)_2SO_4$)

The total amount of off-gas was 77.7 L of the following composition:

76.1 vol % of $H_2$ 19.6 vol % of NO 3.0 vol % of $N_2O$

The following values for selectivity and space-time yield can be calculated from these results:
Selectivity:

76.1% toward $NH_2OH$ 19.5 % toward $NH_3$ 4.4 % toward $N_2O$

Space-time yield:

1.1 8 mol/$L_{RR}$fl..h, based on NO conversion (consumption)

0.90 mol/$L_{RR}$fl..h, based on $NH_2OH$.

COMPARATIVE EXAMPLE

A suspension formed from 640 g (calculated as dry substance) of a finely divided graphite support (particle size in the range of from 0.1 to 300 μm), 500 mL of water, 100 mL of aqua regia, and 0.5 wt % of platinum as hexachloroplatinic acid hexahydrate was stirred overnight at a temperature of 80° C. The next day, the suspension was diluted with 400 mL of water, cooled to 30° C., and adjusted to pH 3.0 with soda. 80mL of a 40 wt % strength sodium acetate solution was then passed, as buffer substance, into the reaction mixture. 15 mL of a 5 wt % strength $Na_2S_2O_4$ solution were then added until a redox potential of 430 mV was achieved. mL of 99 wt % strength formic acid were then added to the reaction mixture. A Pt/Ag/AgCl electrode (Metrohm, Herisau) served as redox electrode. Calibration was effected using a redox calibrating solution for a Pt/Ag/AgCl electrode (Schott-Geraete GmbH, Hofheim) having a redox potential of +475 mV at a temperature of 20° C.

50 g of the catalyst thus treated were suspended in 1250 mL of 20 wt % strength $H_2SO_4$ and treated with $H_2$ at a temperature of 40° C.

100 L/h of a mixture of 70.0 vol % of $H_2$ (99.95% strength) and 30.0 vol % of NO (99.6% strength) were then fed to the suspension.

Following the introduction of a total of 300 L of the above gas mixture there were obtained 1338 mL of a solution having the following composition:

84.7 g/L $H_2SO_4$ 55.5 g/L $NH_2OH$ (as $(NH_3OH)_2SO_4$)

13.2 g/L $NH_3$ (as $(NH_4)_2SO_4$)

The total amount of off-gas was 59.0 L of the following composition:

77.0 vol % of $H_2$ 15.4 vol % of NO 8.6 vol % of NO

The following values for selectivity and space-time yield can be calculated from these results:

Selectivity:

60.0% toward $NH_2OH$ 27.8% toward $NH_3$ 12.2% toward $N_2O$

Space-time yield:

0.99 mol/$L_{RR}$fl..h, based on NO conversion (consumption)

0.59 mol/$L_{RR}$fl..h, based on $NH_2OH$ formed.

We claim:

1. A process for the preparation of a hydrogenation catalyst consisting essentially of
   (a) treating a platinum metal salt with finely divided sulfur, and
   (b) reducing the treated platinum metal salt to metallic platinum metal.

2. A process as defined in claim 1, wherein the particle size of the finely divided sulfur is less than 500 μm.

3. A process as defined in claim 1, wherein the reduction (step (b)) is carried out in the presence of a catalyst support material.

4. A process as defined in claim 1, wherein the process steps are carried out in an aqueous medium.

5. A process as defined in claim 1, wherein the treatment with finely divided sulfur is carried out in the presence of a surfactant.

6. A process as defined in claim 1, wherein the molar ratio of platinum metal to sulfur is in the range of from 90 to 10.

* * * * *